May 19, 1942.   P. W. BURNHAM   2,283,537
CONTROLLING DEVICE FOR FIRE-DOORS
Filed Nov. 25, 1940   5 Sheets-Sheet 1

WITNESSES:

INVENTOR:
Philip W. Burnham,
BY
ATTORNEYS.

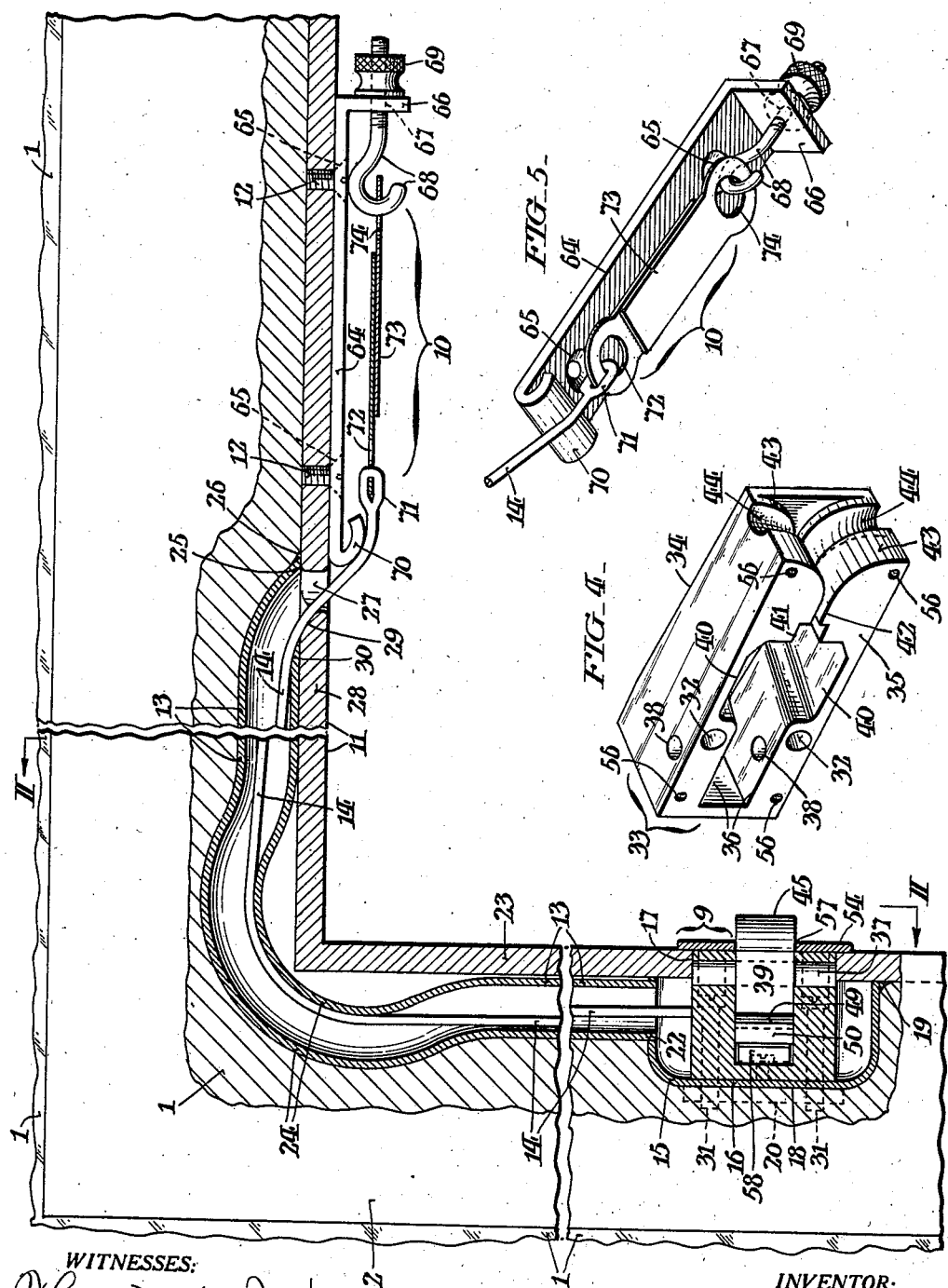

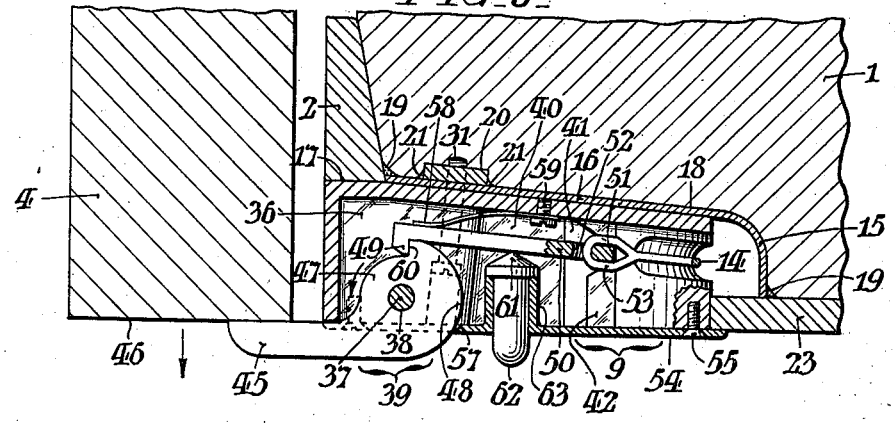
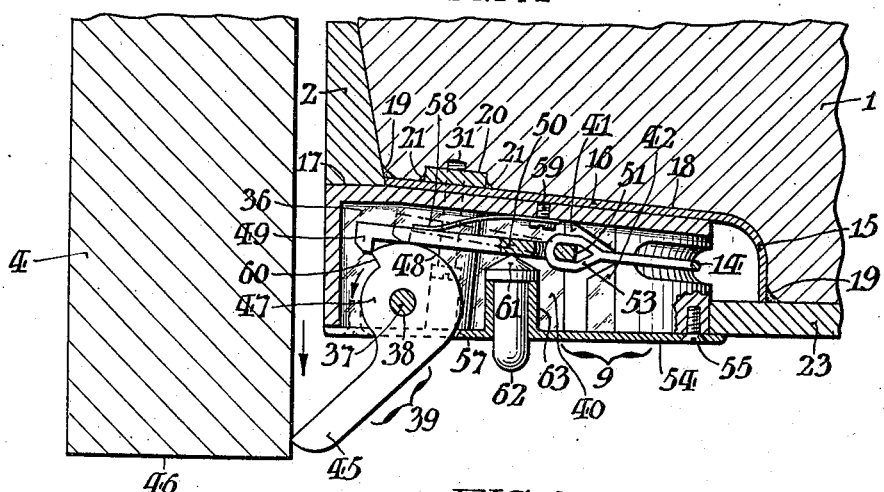
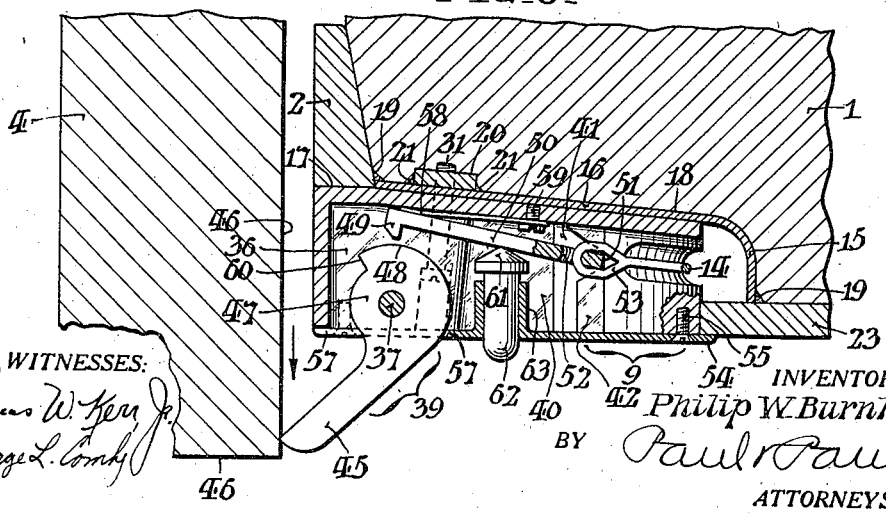

May 19, 1942.　　　　P. W. BURNHAM　　　　2,283,537
CONTROLLING DEVICE FOR FIRE-DOORS
Filed Nov. 25, 1940　　　　5 Sheets-Sheet 4
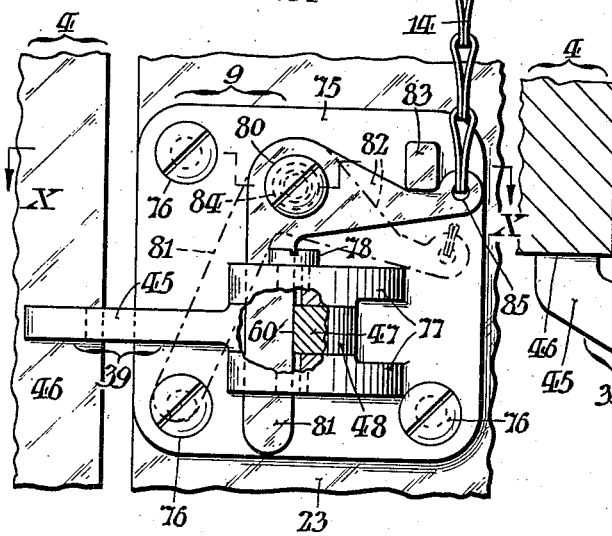
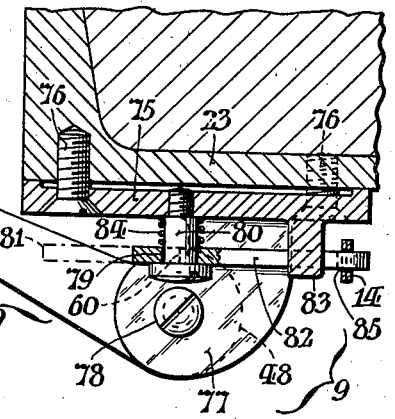
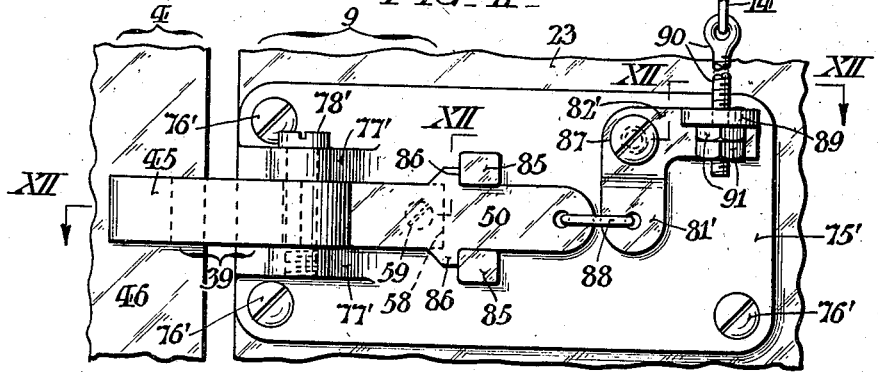
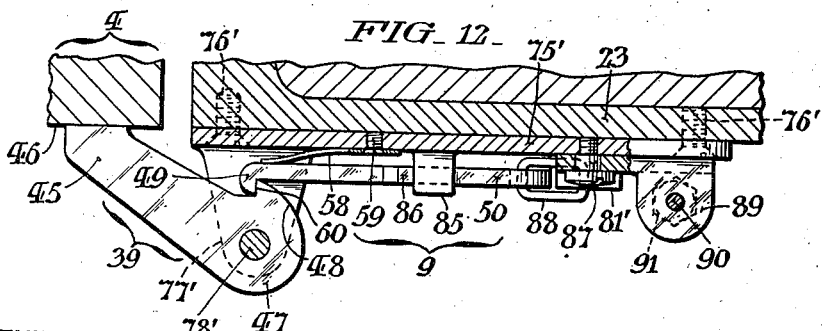
WITNESSES:
Thomas W. Kerr, Jr.
George L. Comby
INVENTOR:
Philip W. Burnham,
BY Paul & Paul
ATTORNEYS.

May 19, 1942.  P. W. BURNHAM  2,283,537
CONTROLLING DEVICE FOR FIRE-DOORS
Filed Nov. 25, 1940   5 Sheets-Sheet 5
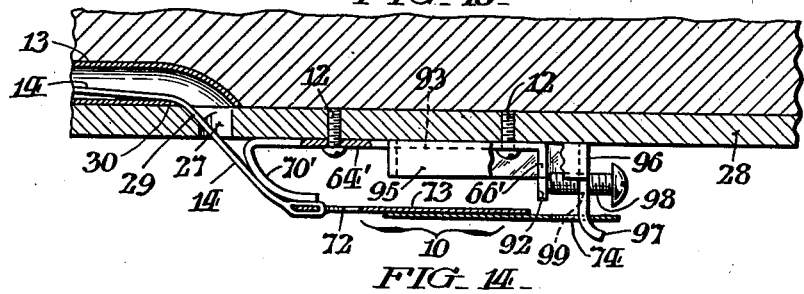
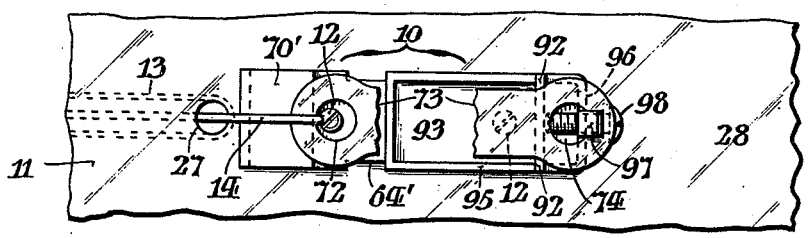
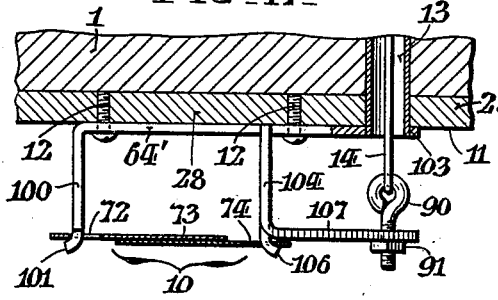
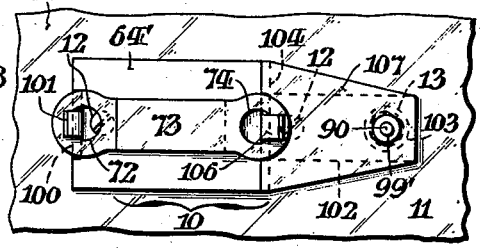
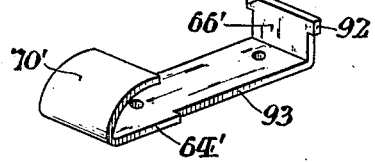
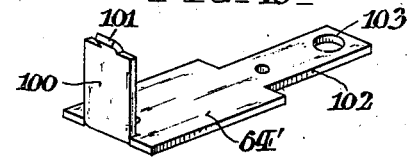
WITNESSES:
INVENTOR:
Philip W. Burnham,
BY
ATTORNEYS.

Patented May 19, 1942

2,283,537

UNITED STATES PATENT OFFICE 2,283,537

CONTROLLING DEVICE FOR FIRE DOORS

Philip W. Burnham, Summit, N. J., assignor of one-half to Richard D. Ward, Wilmington, Del.

Application November 25, 1940, Serial No. 367,028

11 Claims. (Cl. 189—47)

This invention in its broader aspect has reference to means effective to normally hold slidable closures away from, or to one side of, an opening or passageway but which, when released, permit said closure to gravitate or otherwise move into active or shutting position with respect thereto.

More specifically, the present improvements relate to sliding doors adapted for automatic closure in the event of fire. Such doors are customarily suspended by rotary hangers from an inclined track above and to one side of the doorway it is designed to close, in combination with means normally retaining the door in open position but releasable when the temperature in the vicinity of said door attains a degree sufficient to melt a fusible element associated with such retainer means.

The fundamental aim of this invention is to provide an improved releasing device of the above indicated species, for controlling fire-doors which is effective to hold the door normally open but to release said door, for automatic closure, in the event of fire.

Another aim is to furnish a fire-door controlling device, for the above referred to purpose, which includes means operative to release the door for inspection purposes without in any way disturbing the fusible element.

A further aim of this invention resides in the provision of the constructive improvements in, and the novel relationship of, parts by which the foregoing aims may be carried into practical effect easily and effectually at comparatively low cost.

Still further objects with ancillary advantages of this invention will become apparent from the following detailed explanation of the typical embodiments thereof shown by the accompanying sheets of illustrative drawings, wherein like reference characters designate corresponding parts in all the views; while the concluding claims more particularly recite the features of novelty over the prior art.

In the drawings:

Fig. 3 is a broken and mainly sectional view included within the confines of the dot-and-dash rectangle III in Fig. 1, but drawn to a larger scale for better illustration of constructional details.

Fig. 4 is a perspective view of the lock body member hereinafter fully described.

Fig. 5 is a perspective view of the fusible link assembly.

Fig. 6 is a plan section, taken approximately as indicated by the arrows VI—VI in Fig. 2.

Fig. 7 is a similar plan section with certain movable parts in different position, as effected by rupture of the fusible element or link hereinafter further explained.

Fig. 8 is a corresponding view to Fig. 6, but illustrating how the controlling device of this invention may be manually released for inspection purposes.

Fig. 9 is a face view of a modified form of the door-locking assembly with a minor portion broken-out for the better illustration of an otherwise hidden feature.

Fig. 10 is a cross-section taken substantially as indicated by the staggered dot-and-dash line X—X in Fig. 9.

Fig. 11 is a similar view to Fig. 9 of a further modified form of the door locking assembly.

Fig. 12 is a cross-section taken approximately on the staggered dot-and-dash line XII—XII of Fig. 11.

Fig. 13 is a part sectional and part plan view of a modified form of the fusible link assembly.

Fig. 14 is an elevation of the same, as viewed from below Fig. 13, with a portion of the fusible link element broken out.

Fig. 15 is a perspective view of a stationary guide element included in the assembly of Figs. 13 and 14.

Fig. 16 is a perspective view of a tensioning member or adjustable keeper component included in the assembly of Figs. 13 and 14.

Fig. 17 is a similar view to Fig. 13 of a further modified fusible link assembly.

Fig. 18 is an elevation of the same as viewed from below Fig. 17.

Fig. 19 is a perspective view of a stationary member included in the assembly of Fig. 17; and, Fig. 20 is a perspective view of the relatively movable keeper component included in the same assembly.

Figure 1:
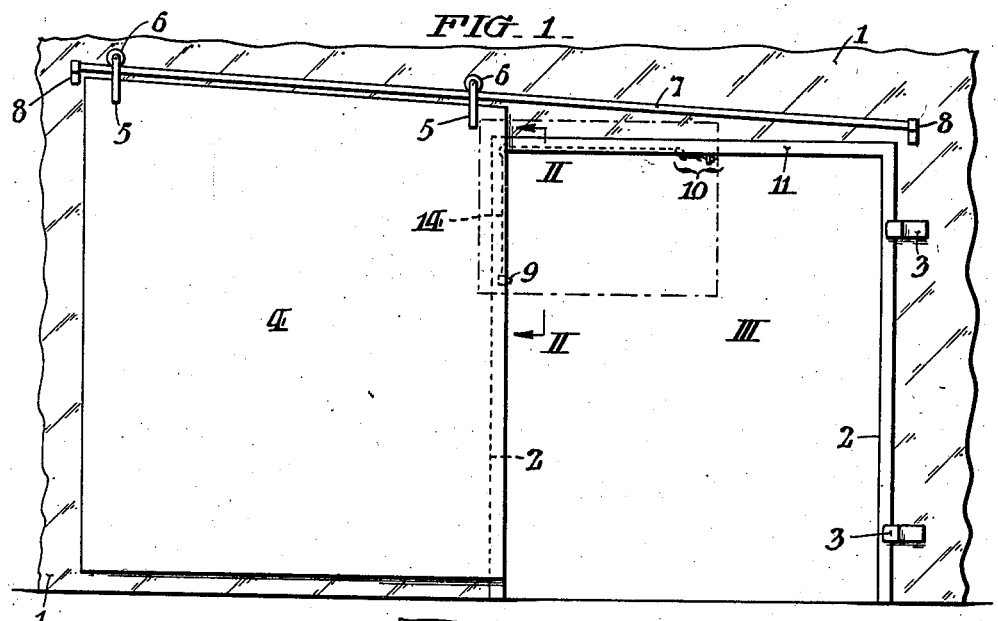
Fig. 1 is a fragmentary view of a wall and firedoor construction in accordance with this invention, said door being shown in the open position relative to the doorway.

In describing the forms of this invention illustrated in the five sheets of drawings herewith, specific terms will be employed for the sake of clarity, but it is to be understood the scope of said invention is not thereby limited; each such term being intended to embrace all equivalents which perform the same function for an analogous purpose.

Referring more in detail to the drawings, a portion of a wall is designated by the reference character 1, the same having an opening fitted with a doorway frame 2 conveniently of channel section, and associated Z-section stops or cleats 3 secured to the adjoining wall portion. The door 4 is of standard fireproof construction, having hangers 5 fitted with rollers 6 grooved for travel along an inclined track 7 supported from the wall 1 by brackets 8, all in accordance with prevailing practice.

The improved controlling means of this invention comprises a lock assembly comprehensively designated 9 for securement preferably in, or to, the doorway framing 2; a fusible link assembly 10 for attachment conveniently to the underside of the framing top portion or rail 11, as by tap screws 12, for instance; and a connector conduit 13 for the flexible coupler element 14.

Referring now to the embodiment of this invention, illustrated in Figs. 1-8, inclusive, it will be observed that the lock assembly 9 comprises a metal housing 15 having an inclined inner wall 16, said housing fitting a cut-out and recess 17, 18, respectively, made in the doorway framing 2 and wall 1, said housing being permanently secured to the framing by welds 19, in an obvious manner. A reinforcing bar 20 is conveniently attached to the inclined wall 16 by welds 21, for a purpose later on explained.

Rigidly secured at 22 into the housing 15 is one end of the connector conduit 13, said conduit being disposed in adjoining proximity along the web portion 23 of the framing 2 and arcuately bent at 24—Fig. 3—around the angular upper corner of said framing and along the corresponding portion of the top rail 11 thereof, so as to avoid any sharp turn and also afford smooth guidance for the flexible coupler element 14. The upper end of the conduit 13 is angularly sheared-off at 25 and connected by a weld 26, to the top rail 11, over an orifice 27 through the web-portion 28 of said rail; such orifice being preferably grooved at 29 for curvilinear guidance of the coupler element 14, with the adjoining edge of the conduit mergently rounded thereinto at 30, for a like purpose.

Fitted in the housing 15 and rigidly held in place by screws 31, seating in borings 32 with their threaded ends engaged through said housing into the reinforcing bar 20, is the lock body 33, shown to best advantage by Fig. 4. This lock body 33, it will be observed, is of generally rectangular contour with a sloping face 34 adapted to the inclined wall 16 of the housing 15 and the opposing face 35 arranged for planar registration with the outer face of the frame web portion 23. In addition, the lock body 33 is formed with a multipartite recess including a section 36 affording free pivotal bearing, by aid of a pin 37 engaged in axially aligned holes 38, for the door holder 39; a substantially wider midsection 40, for housing certain elements hereafter described; and a comparatively narrow stepped extension 41, 42—Fig. 2—into which merge opposed end curvatures 43, said curvatures having central grooves 44, the purpose whereof is to render the lock body "reversible," or usable at either side of the doorway frame 2 without any structural change; as readily understandable by those conversant with the art.

Figure 2:
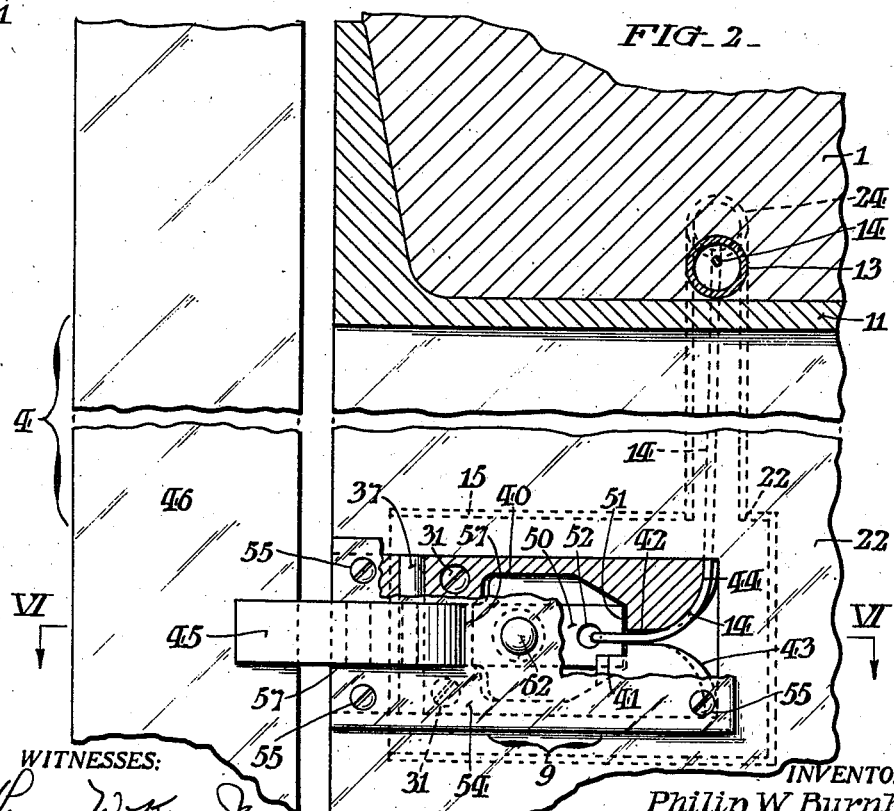
Fig. 2 is a part sectional and part face view, taken approximately on the plane II—II in Figs. 1 and 3.

The door holder 39 is somewhat in the form of a pivotal pawl, that is to say it embodies a stop portion 45 for coaction with the confronting edge 46 of the door 4, and an axially apertured discous portion 47, by which it is fulcrumed in the recess section 36 to the pin 37, with an eccentric rise or cam 48. Coactive with the holder cam 48 is the tooth end 49 of a hook or slidable latch device 50, having the opposite squared end 51 adapted to the stepped extension 41, 42 and apertured at 52 for connection of the looped extremity 53 of the flexible coupler element 14. It will be readily understood from Figs. 2 and 6-8, inclusive, that the latch device 50 is of a vertical depth for free angular movement in the recess section 41, 42 at the rear of the cam 48; while it also is held under tension and fulcrumed in the recess extension 41, 42, respectively as shown in Figs. 2, 6 and 8 to best advantage, for purposes later on fully clarified. The lock body 33 is substantially closed-in by a cover plate 54, secured in place by set screws 55, engaging in correspondingly threaded holes 56 provided for their reception in the lock body 33; while a cut-out 57 in said cover plate accommodates angular movement of the stop portion 45 of the door holder 39 in an obvious manner.

The door holder latch device 50 is influenced outwardly by a strip spring 58, attached to the lock body 33 at one end by a screw 59, with the opposite end flexed outwards for coaction against the inner longitudinal edge of said latch device 50. Now it will be readily apparent that normally the tooth end 49 of the latch device 50 engages the radial end 60 of the cam 48, as shown in Fig. 6, except when released by the fusible link assembly 10 as later on set forth; or when manually disengaged therefrom, in opposition to the spring 58, by aid of the conical end 61 of a push button 62, axially shiftable in a tubular projection 63 provided for its reception on the inner face of the cover plate 54.

Referring now to the fusible link assembly 10, and as best shown in Figs. 3 and 5, said assembly comprises a main attachment member 64 having countersink holes 65 for reception of the heads of the tap screws 12, one end of said member being angled at 66 and apertured at 67 for free passage of the shank of a screw hook 68, fitted with an adjuster nut 69; whereas the other end of the member 64 is arcually retroverted at 70 for smooth coaction therewith of the adjoining end of the coupler element 14, to the looper end 71 whereof is secured the one eyed-end 72 of a fusible link 73, the other eyed-end 74 being engaged with the hook 68.

In the modified form of the lock assembly 9, shown by Figs. 9 and 10, which is adapted for attachment to the doorway frame 2, instead of being inset therein, as described in connection with Figs. 1-8, inclusive, the same comprises a substantially square base 75 for attachment to the frame web 23 by tap screws 76, in an obvious manner, said base having spaced projecting lugs 77 between which the door holder 39 is pivoted by a screw stud 78, as clearly apparent. The latch device for retaining the door holder 39 in active position is in the form of a bell crank freely pivoted at 79 on a screw stud 80 rigidly fixed to the base 75, said bell crank having one arm 81 coactive with the cam radial edge 60, while the other or counterbalancing arm 82 is adapted for abutment with a rectangular section stop 83, integral with the base 75. The bell crank is also adapted for axial movement along the stud 80 in opposition to a buffer spring 84, influencing it outwards, for manual release, as and when desirable; while the flexible coupling element 14, in this form of the invention, is shown as a chain and it is looped to the free end of the bell crank horizontal arm 82 at 85.

In the further modified form of the lock assembly 9, shown in Figs. 11 and 12, which is a variation of the species described in the preceding paragraph, similar reference characters are applied to corresponding parts with a prime exponent for easier identification, and to obviate unnecessary repetitive explanation. The base 75' is rectangular with the longer dimension horizontal, while the spaced lugs 77' adjoin the outer vertical edge with the door holder 39 of smaller proportions. The latch device 50 is somewhat similar to its complement of Figs. 1–8, inclusive, excepting that it is arranged for slidable support between spaced tabs 85 projecting from the base 75', and it is formed with abutment portions 86 coactive with alinged sides of said tabs, for limiting the movement thereof in one direction, or in opposition to the normal "pull" of the flexible coupler element 14. The bell crank in this type of the invention is pivotally mounted on a shouldered stud 87 with the vertical arm 81' coupled to the adjoining end of the latch device 50 by a link 88. On the other hand, the horizontal arm 82' is provided with a laterally directed apertured lug 89, for reception of an eye-bolt 90, to which the adjoining end 53, of the coupling element 14, is connected; and said bolt 90 is fitted with lock nuts 91 for securing it at the requisite adjustment.

Referring now to the modified form of the fusible link assembly 10 shown by Figs. 13–16, inclusive, it will be observed the main or attachment member 64' is substantially similar to its complement 64 of Figs. 1–8, inclusive, excepting that the angled end 66' is formed with side projections or ears 92 and is not apertured; while said member 64' is longitudinally reduced to define a guide portion 93, in paralleling alignment with the inner ends of said projections; while the arcual retroversion 70' is made deeper relative to the plane of the member 64'. Coactive with the guide portion 93, by aid of a transverse cut-out 94, Fig. 16, and slidably engaging the under face of the doorway frame web 28, is a rectangular open tensioning member or keeper component 95, having the one end wall 96 deeper than the others, and provided with a medial outwardly-turned tongue 97 for hook engagement by the adjoining eyed-end 74 of the fusible link 73. The other eyed-end 72 of the link 73 is attached to the coupler element 14, as described in connection with Figs. 1–8. For purposes of adjustment, a tensioning screw 98 threadedly engages through a bore 38—Fig. 16—in the end wall 96 with its inner end adapted to abut the outer face of the attachment member angled end 66'.

In the further modified form of fusible link assembly 10 shown by Figs. 17–20, inclusive, it will be seen that the attachment member 64' is provided at one end with an angularly related section 100 having a medial tongue 101 for engagement by one eyed-end 72 of the fusible link 73 and a comparatively narrower shank or extension 102 at the other end with an orifice 103 for connection of the adjoining end of the conduit 13. The tensioning member is in the form of an angle-section having one flange 104 notched out at 105 for sliding coaction with the extension 102 of the attachment member 64', and a stamped out tongue 106 for connection of the other eyed-end 74 of the fusible link 73. The other flange 107 is of quadrilateral or trapezoidal contour with an aperture 99' for free passage of an eye bolt 90, having a nut 91, to which the proximate end of the coupling element 14 is connected as hereinbefore set forth.

Having described the structural details of this invention, the manner of installation and usage may be briefly described as follows. Preferably, before the doorway frame 2 is installed, the cut-out 17 is made, and the hole 27 in the top rail web 28 drilled and reamed; while the holes for attachment of the fusible link assembly 10 are drilled and tapped for reception of the screws 12. The lock housing 15 and conduit 13 are next welded in their proper positions, whereupon the frame 2 is ready for installation in accordance with known practice. Subsequently the lock body 33 is fitted and secured in the housing 15 by the screws 31, with the near end of the flexible coupling element 14 previously passed through the conduit 13 and attached to the slidable latch 50 as before described. The fusible link assembly 10 is next attached by the tap screws 12 to the frame top rail web 28, with the adjoining end of the coupler element 14 connected to the link proximate eyed-end 72 of the fusible link 73; whereupon the opposing eyed-end 74 of said link is engaged with the screw hook 68 and the latter tightened-up by the adjuster nut 69, to apply the needful tension to said coupler element 14. Application of this tensioning by the adjuster nut 69 draws the apertured end 52 of the latch 50 into the stepped recess 41, 42 of the lock body 33, and causes said latch to fulcrum outwardly towards the cover plate 54. This fulcrum movement of the latch 50 swings its tooth end 49 into arrestive engagement with the radial face 60 of the door holding cam portion 48, whereby the holder 39 is stationarily held in position for location of the stop portion 45 in the path of the door confronting edge 46, in an obvious manner, or with said holder arrested in the lock body recess section 36; it being equally apparent that the forward end of the spring 58 aids the fulcrum movement of the latch 50 above referred to. The holder 39, see Fig. 6 to best advantage, is thus placed in a position to stop the door 4 with its edge 46 flush with the jamb portion of the frame 2; and said door being suspended from the inclined track normally exerts a constant pressure against the holder stop portion 45 and thereby maintains the parts 49, 60 in rigid engagement. By the same token, arrestation of the sliding tendency of the door 4 imparts a counter-clockwise rotary tendency on the door holder 39 which induces a constant pull on the latch 50, such pull being transmitted by the coupler element 14, to the fusible link 73 in a clearly apparent manner. As long as the fusible link 73 remains intact the tension exerted by the door 4 on the coupler element 14 is counteracted by the screw hook 68 and all the intervening movable parts remain stationary. However, when the temperature in the immediate vicinity of the fusible link 73 attains a determined degree that effects disruption of its components, the coupler element 14 becomes released, whereby the latch 50 and door holder 39 are released for free movement under the influence of the sliding door 4 gravitating along the inclined track 7, such movement swinging the holder 39 from the position of Fig. 6 to that of Fig. 7, or with concurrent drawing of the coupler element 14 through the conduit 13 a short distance, corresponding to the travel permitted the latch 50, until its tooth end 49 is free of engagement with the radial face 60 of the cam portion 48, as readily understandable by those acquainted with the art; whereupon the door 4 will continue gravitation along the track 7 until it closes the opening within the confines of the frame 2. To re-set the holding means described, it is first necessary to replace the disrupted fusible link 73 with a new one, whereupon the adjuster nut 69 is manipulated to take-up the slack in the element 14, until the squared end 51 of the latch 50 again seats in the stepped recess section 41, 42 of the lock body 33. Incidental to the operation just explained, the latch 50 will be drawn over the cam portion 48 of the holder 39, flexing the spring 58 as it advances, until said latch approximately reaches the dot-and-dash line indication in Fig. 7, whereupon the door 4 can be moved to the full open showing of Fig. 1; when by turning the holder 39 clockwise to its normal location of Fig. 6, the spring 58 will react to snap the latch tooth 49 into abutment with the cam radial face 60 and thereby again lock the door 4 in the open position. When it is desired to release the door 4 without disturbing the fusible link 73, it is only necessary to press on the push button 62, Figs. 1-8; the bell crank 81, 82 of Figs. 9 and 10; or the latch 50 of Figs. 11 and 12; when such pressure is transmitted to the spring 58, or 84, with resultant release of the parts 49, 60; or 81, 60; whereupon the door holder 39 is freed for counterclockwise rotation on the pivot pin 37 under the gravitational movement of the door 4.

It will also be readily seen that where the door frames 2 are already installed, either of the two forms of lock assembly 9, shown in Figs. 9-12, can be readily applied by simply drilling and tapping the necessary holes for reception of the attaching screws 76 or 76'; such assemblies being preferably secured to the web portions 23 of the frame side jambs as hereinbefore explained. Furthermore, in order to facilitate these installations, the conduit 13 is preferably attached to the outer face of the web portions 33; or, it may be omitted and the flexible coupling element 14 simply passed through screw-eyes—not shown—intermediate the lock assembly 9 and the fusible link assembly 10, such screw-eyes being suitably spaced and threaded into tapped holes provided for the purpose in the frame web portions 23 and 28 as readily understandable by those acquainted with the art.

From the foregoing it will be readily seen that by insetting the lock assembly 9 as shown in Figs. 1-8, and locating the connector conduit within the frame 2, said parts are out of the way whereby the external appearance of said frame is not impaired, thus rendering this invention highly advantageous for use in banks and other buildings where a neatly finished appearance is very important; while concealment of such parts better ensures protection against illicit tampering, and furthermore eliminates objectionable obstructive projections.

Finally, while preferred forms of the invention have been disclosed and are more particularly featured in the following claims; it will be understood that various substitutions and other arrangements of the lock assembly 9 and fusible link assembly 10 may be made by those skilled in the art, in addition to changes in the structural details, without departing from the spirit of said invention.

Having thus described my invention, I claim:

1. A controlling device for sliding fire-doors comprising in combination, a lock assembly including a pivotal stop for coaction with the edge of the door, to hold said door open, and a cam portion having a radial edge; a spring influenced member in the lock assembly capable of longitudinal and lateral movement, said member having a tooth engageable with the cam portion radial edge to hold the pivotal stop in active position; a fusible link assembly including an attachment member, and a relatively movable adjuster means, connected to one end of the fusible link; and a flexible coupler operatively coordinating the other end of said fusible link to the spring influenced movable member for tension influencing the stop counteractively with respect to the door.

2. A controlling device for gravity-influenced fire-doors comprising in combination, a lock assembly including a pivotal stop for abutment by the edge of the door, to hold said door in open position, and a cam portion with a radial edge; a spring influenced latch in the lock assembly capable of planar and angularly related movement, said member having a tooth engageable by radial edge of the cam portion to lock the pivotal stop in active position; a fusible link assembly including an attachment member, and a relatively movable tension applying device, connected to one end of the fusible link; and a flexible coupler operatively coordinating the other end of the fusible link to the movable latch for tension influencing said latch and the pivotal stop counteractively with respect to the door.

3. A controlling device for gravity-influenced fire-doors closable over a framed opening and comprising in combination, a lock assembly including a pivotal stop for abutment by the edge of the door, to hold the latter open, said stop embodying a cam portion with a radial edge; a spring influenced latch slidably guided in the lock assembly with means permitting it to have a degree of fulcrum movement, said latch having a tooth engageable by the radial edge of the cam portion of the pivotal stop to hold the latter in active position; a fusible link assembly including an attachment member, and a relatively movable tension applying device connected to one end of the fusible link; a conduit physically connecting the lock assembly with the fusible link assembly; a flexible element through the conduit operatively coordinating the other end of the fusible link to the slidable latch for effecting engagement of the latch tooth wih the cam portion radial edge; and means in the lock assembly operative to release the latch from engagement with the pivotal stop cam portion without disturbing the other parts of the controlling device.

4. A controlling device for gravity-influenced fire-doors closable over a framed doorway and comprising in combination, a lock assembly including a recessed body member inset flush with a jamb portion of the doorway frame, said assembly including a pivotal stop for abutment by the edge of the door, to hold it open, and also embodying a cam portion with a radial edge; a spring influenced slidable latch having a tooth at one end engageable by the cam portion radial edge to secure the pivotal stop in active position; a fusible link assembly secured to the doorway frame top rail including an attachment component, and a relatively movable tension applying device connected to one end of the fusible link; a conduit, concealed within the doorway frame, physically connecting the lock asembly to the fusible link assembly; a flexible coupler element through the conduit, operatively coordinating the other end of the fusible link to the slidable latch and effective to engage the latch tooth with the cam portion radial edge; and a push button in the lock assembly for releasing the latch from engagement with the pivotal stop cam radial edge without disturbing the other parts of the controlling device.

5. The combination of claim 4, further characterized by a doorway frame of channel section throughout, said lock assembly is substantially closed in a housing, and said housing being permanently secured inwardly of an angular cut-out including a portion of the channel section web and the adjoining flange.

6. The combination of claim 4, wherein the conduit physically connecting the lock assembly to the fusible link assembly is proximately disposed along the inner face of the channel section frame jamb and the corresponding top rail portion, said conduit having an undulate bend around the upper angular corner of the frame, and the one end of said conduit is permanently secured into the lock assembly housing with the other end sheared-off to overlie an orifice in, and for secure attachment to, the top rail web, and said top rail orifice is reamed and mergently grooved into the last mentioned end of the conduit.

7. The combination of claim 4, wherein the lock assembly comprises a multipartite recessed generally rectangular body member having one face sloped for coaction with the correspondingly inclined inner back wall of the housing, one section of the body member recess affording pivotal bearing for the door stop, a comparatively deeper medial section, and a relatively narrow stepped section; and opposed curvatures of the body member merging with the stepped section, and central grooves in said curvatures for guidance of the flexible coupler element whereby the lock assembly is made reversible.

8. The combination of claim 4, wherein the door stop is in the form of a pivotal pawl embodying a tangentially related portion for coaction with the edge of the door and an eccentric cam section having a radial end face, the slidable latch embodies a tooth portion at one extremity movable in one end of the body member recess for coaction with the cam section radial end face, the opposing extremity of said latch being squared for fulcrum bearing in the opposed end of said body member recess, and spring means in said recess normally maintain the slidable latch tooth ended portion in coaction with the door stop cam section.

9. The combination of claim 4, wherein the lock body member, pivotal stop, and slidable latch, are mounted in a housing inset relative to the jamb section of the doorway frame, a cover plate is attached to said housing with a cut-out to accommodate angular movement of the pivotal stop, an inward tubular projection is provided on the cover plate, and a push button in said projection is operative to manually release the latch from coaction with the pivotal stop.

10. The combination of claim 3, wherein the lock assembly comprises a base for attachment exteriorly to the frame of the doorway; spaced apertured lugs afford pivotal bearing for the stop engageable by the door; the movable latch is in the form of an outwardly spring-influenced bell crank pivotally supported by the base, said bell crank having one arm coactive with the door stop cam portion radial edge to hold the door in open position, and the other arm being apertured at its free end for connection of the flexible element, said latter arm also serving as a counterbalance for the bell crank when released by pressure applied in opposition to its influencing spring; and a stop projection on the base limits counterclockwise movement of the bell crank upwardly beyond the horizontal.

11. The combination of claim 3, wherein the lock assembly comprises a rectangular base, spaced apertured lugs adjoin one edge of said base for pivotal bearing of the door stop, paralleling and relatively spaced tabs jointly afford with the spaced lugs for slidable support of the spring-influenced latch, opposed abutments on said latch coact with aligned sides of the tabs to limit manual movement of the latch away from its active position, an angle lever pivotally mounted on the base has one arm coupled by a link to the end of the latch remote from its cam engaging end, the other arm has an apertured lateral lug, and adjuster means connect said lug to the adjoining end of the flexible element.

PHILIP W. BURNHAM.